United States Patent [19]
Uwabo et al.

[11] Patent Number: 5,844,746
[45] Date of Patent: Dec. 1, 1998

[54] HIGH-DENSITY DISK DRIVE HAVING A COVER PORTION WHICH PROTECTS A LIGHT WEIGHT HEAD CARRIAGE FROM ELECTROMAGNETIC NOISE

[75] Inventors: Tsuneo Uwabo, Hachiouji; Yoshihiro Okano; Eiichi Yoneyama, both of Atsugi; Yoshinori Tangi, Hachiouji, all of Japan

[73] Assignee: Mitsumi Electric Co., Ltd., Tokyo, Japan

[21] Appl. No.: 862,570

[22] Filed: May 23, 1997

[30] Foreign Application Priority Data

May 24, 1996 [JP] Japan ................................. 8-130395

[51] Int. Cl.⁶ ................................................. G11B 33/14
[52] U.S. Cl. ........................................................ 360/97.02
[58] Field of Search ............................... 360/97.01, 97.02

[56] References Cited

U.S. PATENT DOCUMENTS 5,243,495  9/1993  Read et al. ........................... 360/97.01
5,301,075  4/1994  Takemoto ............................. 360/97.02
5,469,311  11/1995 Nishida et al. ....................... 360/97.02
5,600,509  2/1997  Kawakami ............................ 360/97.02

*Primary Examiner*—John H. Wolff
*Attorney, Agent, or Firm*—Frishauf, Holtz, Goodman, Langer & Chick

[57] ABSTRACT

A high-density flexible disk drive includes a main electromagnetic shielding plate and an auxiliary electromagnetic shielding plate. The main electromagnetic shielding plate serves as a cover member for the disk drive, and protects the whole upper surface of a large-capacity flexible disk received in the disk drive, a carriage and a linear motor from electromagnetic noise coming toward the flexible disk, the carriage and the linear motor from the upper side of the disk drive. The auxiliary electromagnetic shielding is attached to the main electromagnetic shielding plate and is smaller than the main electromagnetic shielding plate. The auxiliary electromagnetic shielding plate is arranged and located so as to protect or shield a magnetic head from electromagnetic noise coming toward the magnetic head from the upper side of the disk drive.

9 Claims, 2 Drawing Sheets

HIGH-DENSITY DISK DRIVE HAVING A COVER PORTION WHICH PROTECTS A LIGHT WEIGHT HEAD CARRIAGE FROM ELECTROMAGNETIC NOISE

BACKGROUND OF THE INVENTION

The present invention relates to a disk drive for driving a flexible disk and, in particular, to a high-density disk drive for driving a large-capacity flexible disk.

As is well known, a flexible disk drive is a device for performing data recording and reproducing relative to a flexible disk inserted therein. In recent years, the flexible disk has been improved to have a greater capacity. For example, a large-capacity flexible disk having a storage capacity of 128 Mbytes has been developed while a normal-capacity flexible disk has a storage capacity of 1 Mbyte to 2 Mbytes. Following this, a flexible disk drive has also been developed which is capable of data recording and reproducing relative to such a large-capacity flexible disk.

Hereinafter, a flexible disk drive capable of data recording and reproducing relative to only the large-capacity flexible disk will be referred to as a high-density dedicated flexible disk drive, while a flexible disk drive capable of data recording and reproducing relative to only the normal-capacity flexible disk will be referred to as a normal-density dedicated flexible disk drive. On the other hand, a flexible disk drive capable of data recording and reproducing relative to both the large-capacity and normal-capacity flexible disks will be referred to as a high-density/normal-density flexible disk drive. Further, if there is no need to distinguish between the high-density dedicated flexible disk drive and the high-density/normal-density flexible disk drive, both will be collectively referred to as a high-density flexible disk drive.

One of differences in mechanism between the normal-density dedicated flexible disk drive and the high-density flexible disk drive resides in structure of drive units each for moving a carriage holding a magnetic head in a predetermined radial direction with respect to the flexible disk loaded in the disk drive. Specifically, the normal-density dedicated flexible disk drive employs a stepping motor as the drive unit, while the high-density flexible disk drive employs a linear motor, such as a voice coil motor (VCM), as the drive unit.

Hereinbelow, the voice coil motor employed in the high-density flexible disk drive as the drive unit will be briefly explained. The voice coil motor includes a voice coil disposed rearward of the carriage and wound around a drive shaft extending in parallel to the foregoing predetermined radial direction, and a magnetic circuit for producing a magnetic field intersecting the electric current flowing through the voice coil. With this arrangement, when the electric current flows through the voice coil in a direction intersecting the magnetic field produced by the magnetic circuit, a drive force is generated in an extending direction of the drive shaft due to interaction between the electric current and the magnetic field. This drive force causes the carriage to move in the foregoing predetermined radial direction.

Since the large-capacity flexible disk having a storage capacity of 128 Mbytes has a storage capacity 64 to 128 times as large as that of the normal-capacity flexible disk having a storage capacity of 1 Mbyte to 2 Mbytes, it is preferable that the access speed of the magnetic head to the large-capacity flexible disk in the high-density flexible disk drive is much higher than that in the normal-density dedicated flexible disk drive.

For enabling such high-speed access, it is necessary to reduce the weight of the carriage holding the magnetic head.

The normal-density dedicated flexible disk drive is provided with an electromagnetic shielding plate for protecting the whole upper surface of the loaded normal-capacity flexible disk, the carriage and the stepping motor from electromagnetic noise coming toward the upper surface of the loaded normal-capacity flexible disk, the carriage and the stepping motor from the upper side of the normal-density dedicated flexible disk drive. Further, an auxiliary electromagnetic shielding member made of, for example, permalloy is also provided for protecting the magnetic head from electromagnetic noise coming toward the magnetic head from the upper side of the normal-density dedicated flexible disk drive. This auxiliary electromagnetic shielding member is attached to the magnetic head so that malfunction of the magnetic head due to electromagnetic noise can be prevented.

If, like the normal-density dedicated flexible disk drive, the auxiliary electromagnetic shielding member is attached to the magnetic head in the high-density flexible disk drive, the carriage holding the magnetic head is increased in weight so that it is difficult to achieve the high-speed access of the magnetic head relative to the large-capacity flexible disk and also protection of the magnetic head from the electromagnetic noise.

SUMMARY OF THE INVENTION

Therefore, it is an object of the present invention to provide an improved high-density flexible disk drive which is capable of high-speed access of a magnetic head relative to a large-capacity flexible disk.

According to one aspect of the present invention, there is provided a high-density flexible disk drive in which a carriage holding a magnetic head is moved by a linear motor in a predetermined radial direction relative to a large-capacity flexible disk received in the disk drive, the disk drive comprising a main electromagnetic shielding plate for protecting a whole upper surface of the large-capacity flexible disk, the carriage and the linear motor from electromagnetic noise coming toward them from an upper side of the disk drive; and an auxiliary electromagnetic shielding plate attached to the main electromagnetic shielding plate for protecting the magnetic head from electromagnetic noise coming toward the magnetic head from an upper side of the disk drive.

It may be arranged that the auxiliary electromagnetic shielding plate is attached to an underside of the main electromagnetic shielding plate.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described in detail hereinbelow with reference to the accompanying drawings.

Figure 1:
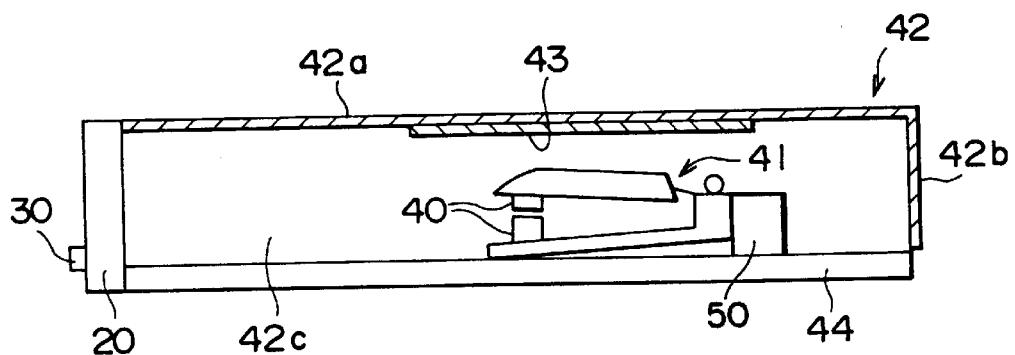
FIG. 1 is a sectional view showing the main part of a high-density flexible disk drive according to a preferred embodiment of the present invention.

Referring to FIG. 1, a high-density flexible disk drive has a front bezel 20 arranged at the front side thereof.

Figure 2:
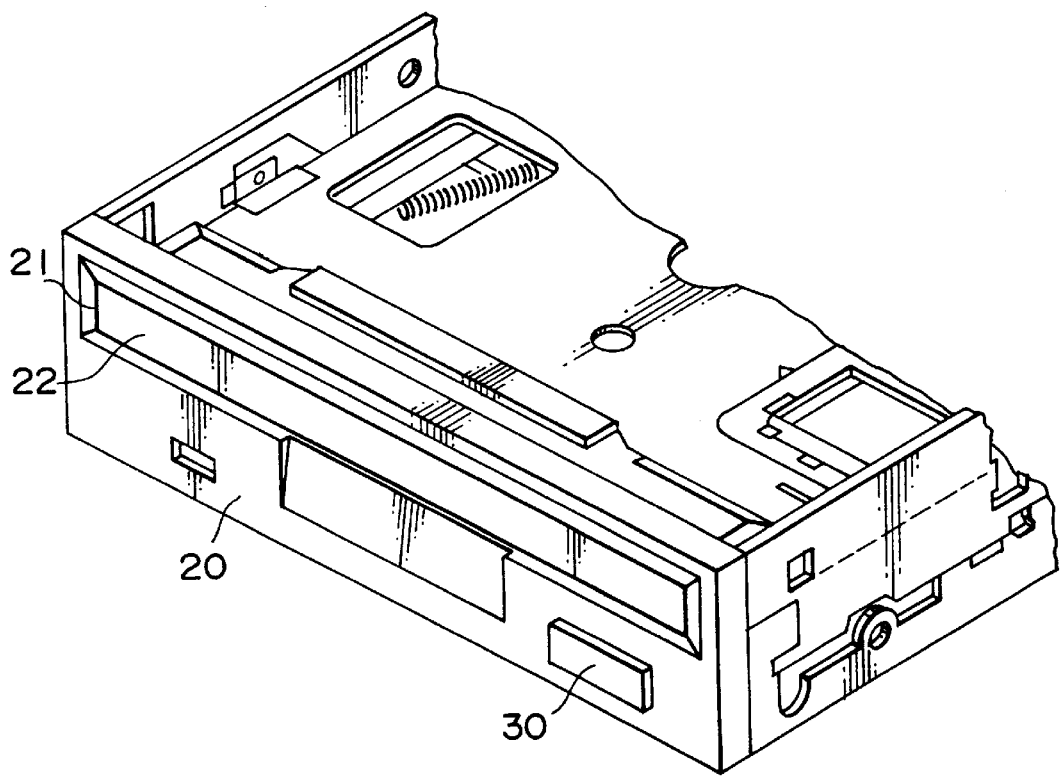
FIG. 2 is a perspective view showing the front side of the high-density flexible disk drive shown in FIG. 1.

Referring to FIG. 2, the front bezel 20 includes a bezel body, a slot 21 formed in the bezel body for insertion and ejection of a large-capacity flexible disk relative to the high-density flexible disk drive, a cover 22 attached to the bezel body for opening and closing the slot 21, and an eject button 30 for ejecting the loaded large-capacity flexible disk from the high-density flexible disk drive. The high-density flexible disk drive is for driving the large-capacity flexible disk received therein.

The eject button 30 protrudes from the bezel body of the front bezel 20 to be displaceable in disk insertion and ejection directions. When the eject button 30 is pushed, the large-capacity flexible disk received in the high-density flexible disk drive is ejected by an eject mechanism which is not shown in the figure.

Figure 3:
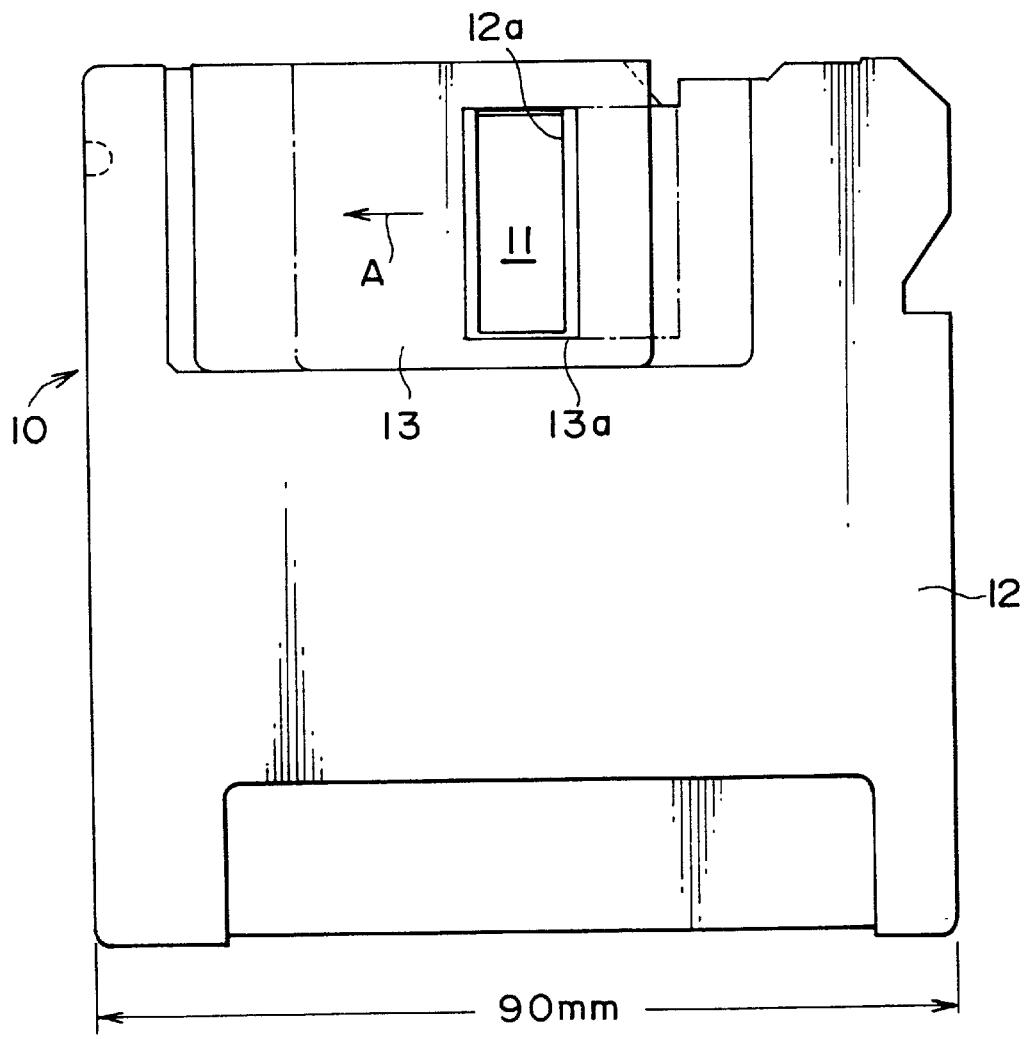
FIG. 3 is a plan view showing a large-capacity flexible disk to be inserted into and ejected from the high-density flexible disk drive shown in FIG. 2.

Referring to FIG. 3, the large-capacity flexible disk is represented by a reference numeral 10. FIG. 3 shows a state of the large-capacity flexible disk 10 inserted or loaded in the high-density flexible disk drive shown in FIGS. 1 and 2.

The large-capacity flexible disk 10 includes a disk-shaped magnetic medium 11, a casing 12 covering the magnetic medium 11, and a shutter 13 slidable in a direction A in the figure. The shutter 13 is provided with a window 13a. The shutter 13 is biased by a spring (not shown) in a direction opposite to the direction A. When the shutter 13 slides in the direction A, the window 13a of the shutter 13 is positioned at an opening 12a of the casing 12. Through the opening 12a, the magnetic medium 11 can be accessed by a pair of magnetic heads 40 of the high-density flexible disk drive shown in FIG. 1.

The casing 12 of the large-capacity flexible disk 10 has a flat rectangular shape of a width of 90 mm, a length of 94 mm and a thickness of 3.3 mm. The size of the casing 12 of the large-capacity flexible disk 10 is equal to that of a casing of a normal-capacity flexible disk.

Referring back to FIG. 1, the high-density flexible disk drive includes a carriage 41 holding the magnetic heads 40, and a schematically linear motor (shown 50), such as a voice coil motor (VCM), as driving means for moving the carriage 41 in a predetermined radial direction with respect to the large-capacity flexible disk 10 loaded in the high-density flexible disk drive.

The high-density flexible disk drive further includes a main electromagnetic shielding plate 42 which serves as a cover for the disk drive. The main electromagnetic shielding plate 42 includes an upper plate 42a (upper cover member) for protecting the whole upper surface of the large-capacity flexible disk 10 received in the high-density flexible disk drive, the carriage 41 and the linear motor 50 from electromagnetic noise coming toward (or directed toward) the upper surface of the large-capacity flexible disk 10, the carriage 41 and the linear motor 50 from the upper side of the high-density flexible disk drive. The main electromagnetic shielding plate 42 further includes a back plate 42b (back cover member) for protecting the large-capacity flexible disk 10, the carriage 41 and the linear motor 50 from electromagnetic noise coming toward (directed toward) them from the back side of the high-density flexible disk drive, and a pair of side plates 42c (side cover members) for protecting the large-capacity flexible disk 10, the carriage 41 and the linear motor 50 from electromagnetic noise coming toward them from the lateral sides of the high-density flexible disk drive. The main electromagnetic shielding plate 42 is made of metal, such as aluminum or iron, and also serves as a cover for the large-capacity flexible disk.

A bottom plate 44 and the front bezel 20 of the high-density flexible disk drive also have shielding functions similar to that of the main electromagnetic shielding plate 42. Accordingly, the loaded large-capacity flexible disk 10, the carriage 41 and the linear motor 50 are also protected from electromagnetic noise coming toward them from the bottom side and the front side of the high-density flexible disk drive.

The high-density flexible disk drive further includes an auxiliary electromagnetic shielding plate 43 attached to the underside of the upper plate 42a of the main electromagnetic shielding plate 42 (upper cover member). The auxiliary electromagnetic shielding plate 43 protects the magnetic heads 40 from electromagnetic noise coming toward the magnetic heads from the upper side of the high-density flexible disk drive. With this arrangement, malfunction of the magnetic heads 40 due to electromagnetic noise can be prevented.

The auxiliary electromagnetic shielding plate 43 is attached to the underside of the upper plate 42a of the main electromagnetic shielding plate 42 so as to protect at least a range where the magnetic heads 40 are moved in the foregoing predetermined radial direction by the voice coil motor 50. The auxiliary electromagnetic shielding plate 43 is made of metal, such as copper, iron or permalloy. The auxiliary electromagnetic shielding plate 43 is attached to the main electromagnetic shielding plate 42 by means of, for example, adhesion by adhesive, adhesion by double-coated adhesive tape, welding, screwing or partial caulking.

As appreciated from the foregoing description, in the high-density flexible disk drive according to the preferred embodiment of the present invention, it is not necessary to attach the auxiliary electromagnetic shielding member to the magnetic head as is done in the normal-density dedicated flexible disk drive. Thus, the carriage 41 holding the magnetic heads 40 is reduced in weight to enable the high-speed access of the magnetic heads 40 relative to the large-capacity flexible disk.

While the present invention has been described in terms of the preferred embodiment, the invention is not to be limited thereto, but can be embodied in various ways without departing from the principle of the invention as defined in the appended claims.

What is claimed is:

1. A high-density disk drive for driving a large-capacity flexible disk, said disk drive comprising:

a carriage on which a magnetic head is mounted;

a linear motor coupled to said carriage and moving said carriage in a predetermined radial direction relative to a large-capacity flexible disk received in said disk drive;

a cover arranged to cover said carriage, said magnetic head, said linear motor and said large-capacity flexible disk received in said disk drive, said cover including a main electromagnetic shielding plate arranged as at least an upper member of said cover, said main electromagnetic shielding plate being dimensioned so as to shield at least a whole upper surface of said large-capacity flexible disk, said carriage and said linear motor from electromagnetic noise directed toward said flexible disk, said carriage and said linear motor from an upper side of said disk drive; and an auxiliary electromagnetic shielding plate attached to said main electromagnetic shielding plate, said auxiliary electromagnetic shielding plate being smaller in size than said main electromagnetic shielding plate and being arranged and located to further shield said magnetic head from electromagnetic noise directed toward said magnetic head from an upper side of said disk drive, said auxiliary electromagnetic shielding plate shielding a smaller area than said main electromagnetic shielding plate.

2. The high-density disk drive according to claim 1, wherein said auxiliary electromagnetic shielding plate is attached to an underside of said main electromagnetic shielding plate so as to be arranged between said main electromagnetic shielding plate and said carriage.

3. The high-density disk drive according to claim 1, wherein said auxiliary electromagnetic shielding plate is adhered to said main electromagnetic shielding plate.

4. The high-density disk drive according to claim 3, wherein said auxiliary electromagnetic shielding plate is adhered to said main electromagnetic shielding plate by an adhesive.

5. The high-density disk drive according to claim 3, wherein said auxiliary electromagnetic shielding plate is adhered to said main electromagnetic shielding plate by a double-coated adhesive tape.

6. The high-density disk drive according to claim 3, wherein said auxiliary electromagnetic shielding plate is adhered to said main electromagnetic shielding plate by caulking material.

7. The high-density disk drive according to claim 1, wherein said auxiliary electromagnetic shielding plate is welded to said main electromagnetic shielding plate.

8. The high-density disk drive according to claim 1, wherein said auxiliary electromagnetic shielding plate is mechanically attached to said main electromagnetic shielding plate.

9. The high-density disk drive according to claim 8, wherein said auxiliary electromagnetic shielding plate is attached to said main electromagnetic shielding plate by at least one screw.

* * * * *